(12) United States Patent
Deriso

(10) Patent No.: US 10,587,582 B2
(45) Date of Patent: Mar. 10, 2020

(54) CERTIFICATE PINNING BY A TUNNEL ENDPOINT

(71) Applicant: VMware, Inc., Palo Alto, CA (US)

(72) Inventor: Jonathon Deriso, Suwanee, GA (US)

(73) Assignee: VMWARE, INC, Palo Alto, CA (US)

( * ) Notice: Subject to any disclaimer, the term of this patent is extended or adjusted under 35 U.S.C. 154(b) by 151 days.

(21) Appl. No.: 15/595,254

(22) Filed: May 15, 2017

(65) Prior Publication Data
US 2018/0332003 A1 Nov. 15, 2018

(51) Int. Cl.
*H04L 29/06* (2006.01)
*H04L 9/32* (2006.01)

(52) U.S. Cl.
CPC .......... *H04L 63/029* (2013.01); *H04L 9/3265* (2013.01); *H04L 9/3268* (2013.01); *H04L 63/0823* (2013.01); *H04L 63/166* (2013.01)

(58) Field of Classification Search
CPC ........... G06F 21/30; G06F 21/33; H04L 9/006
USPC ....................................................... 713/150
See application file for complete search history.

(56) References Cited

U.S. PATENT DOCUMENTS

| | | | |
|---|---|---|---|
| 6,088,805 A | 7/2000 | Davis et al. | |
| 9,231,925 B1 * | 1/2016 | Lundstrom | H04L 9/30 |
| 9,774,590 B1 * | 9/2017 | Bronshtein | H04L 63/0823 |
| 9,888,037 B1 | 2/2018 | Sharifi Mehr | |
| 2004/0030887 A1 | 2/2004 | Harrisville-Wolff et al. | |
| 2006/0005237 A1 | 1/2006 | Kobata et al. | |
| 2009/0126001 A1 | 5/2009 | Krantz et al. | |
| 2010/0306533 A1 * | 12/2010 | Phatak | G06F 21/34 713/156 |
| 2010/0306816 A1 | 12/2010 | McGrew et al. | |
| 2011/0072507 A1 | 3/2011 | Johnston et al. | |
| 2012/0170753 A1 | 7/2012 | Pandrangi et al. | |
| 2013/0166899 A1 | 6/2013 | Courtney et al. | |
| 2013/0267199 A1 | 10/2013 | Kamal et al. | |
| 2013/0305333 A1 | 11/2013 | Katzer et al. | |
| 2014/0228001 A1 | 8/2014 | Kulkarni | |
| 2014/0282925 A1 | 9/2014 | Walsh et al. | |
| 2015/0128205 A1 * | 5/2015 | Mahaffey | H04L 63/20 726/1 |
| 2015/0334094 A1 | 11/2015 | Suresh et al. | |
| 2015/0373048 A1 | 12/2015 | Siddiqui | |

(Continued)

OTHER PUBLICATIONS

International Search Report mailed for Application No. PCT/US2018/032796.
Office Action mailed for U.S. Appl. No. 15/196,763.

*Primary Examiner* — Lynn D Feild
*Assistant Examiner* — Viral S Lakhia
(74) *Attorney, Agent, or Firm* — Thomas | Horstemeyer, LLP

(57) ABSTRACT

Disclosed are various approaches for implementing certificate pinning in a tunnel client on a client device. A tunnel client receives a connection request from an application executed by the client device to connect to a remote server. The tunnel client determines that the remote server corresponds to a known pinned host and then determines whether the remote server presents a certificate matching a pinned certificate for the known pinned host. If the presented certificate matches the pinned certificate, the tunnel client allows a connection to be established between the application and the remote server through a network tunnel between the tunnel client and a tunnel server.

20 Claims, 4 Drawing Sheets

(56) References Cited

U.S. PATENT DOCUMENTS

| | | | |
|---|---|---|---|
| 2016/0043867 A1* | 2/2016 | Bonsignore | G06F 21/34 |
| | | | 713/168 |
| 2016/0065567 A1 | 3/2016 | Aggarwal et al. | |
| 2016/0080157 A1* | 3/2016 | Lundstrom | H04L 63/126 |
| | | | 713/176 |
| 2016/0149898 A1 | 5/2016 | Parla et al. | |
| 2016/0248590 A1* | 8/2016 | Benson | G06F 21/53 |
| 2016/0316025 A1 | 10/2016 | Lloyd et al. | |
| 2017/0054708 A1 | 2/2017 | Zaw et al. | |
| 2017/0070486 A1 | 3/2017 | Lyons et al. | |
| 2017/0078328 A1 | 3/2017 | McGinnity et al. | |
| 2017/0126664 A1 | 5/2017 | Khandelwal et al. | |
| 2017/0171191 A1* | 6/2017 | Cignetti | H04L 63/06 |
| 2017/0230355 A1 | 8/2017 | Su et al. | |
| 2017/0250979 A1* | 8/2017 | Benson | H04L 63/08 |
| 2017/0257360 A1 | 9/2017 | Gattu et al. | |
| 2017/0279619 A1* | 9/2017 | Yang | H04L 9/3268 |
| 2017/0289137 A1 | 10/2017 | Pendarakis et al. | |
| 2017/0339130 A1* | 11/2017 | Reddy | H04L 63/0823 |
| 2017/0346853 A1* | 11/2017 | Wyatt | H04L 43/12 |
| 2018/0123795 A1* | 5/2018 | Norman | H04L 63/029 |
| 2018/0165441 A1* | 6/2018 | Everhart | G06Q 20/382 |
| 2018/0288036 A1 | 10/2018 | Bender et al. | |

\* cited by examiner

CERTIFICATE PINNING BY A TUNNEL ENDPOINT

BACKGROUND

Network applications often use a version of the secure sockets layer (SSL) or transport layer security (TLS) protocols to secure communications between computing devices, such as between a client and a server or between two servers. The SSL and TLS protocols typically provide both authentication and encryption functionality in order for the computing devices to verify each other's identity and for the computing devices to encrypt communications between each other. These functions are typically implemented through the use of certificates issued to one or more of the computing devices in communication with each other.

For example, a server can be issued a certificate from a certificate authority. The certificate will typically include information identifying the owner of the server, the identity of the owner of the certificate authority that issued the certificate, and additional information instructing client devices how to encrypt network traffic sent to the server. When a client attempts a secure communication with the server, the server will provide the certificate to the client. The client will then verify that the certificate was issued by the certificate authority. If the certificate authority is included in a list of trusted certificate authorities maintained by the client, the client will secure communications with the server using the encryption instructions included in the certificate. Typically, client devices will have a preinstalled list of trusted certificate authorities (e.g., a list bundled with the operating system, list bundled with a web browser, or a list bundled with some other client application), although individual certificate authorities can often be manually added to the list of trusted certificate authorities.

As a result, a client does not have to store or otherwise track certificate information for every server that the client can potentially communicate with. Instead, the client can track information pertaining to a smaller number of trusted certificate authorities that issue certificates. So long as the certificate of a server has been issued by one of these trusted certificate authorities, the client will be able to securely communicate with the server using a version of the SSL or TLS protocol.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
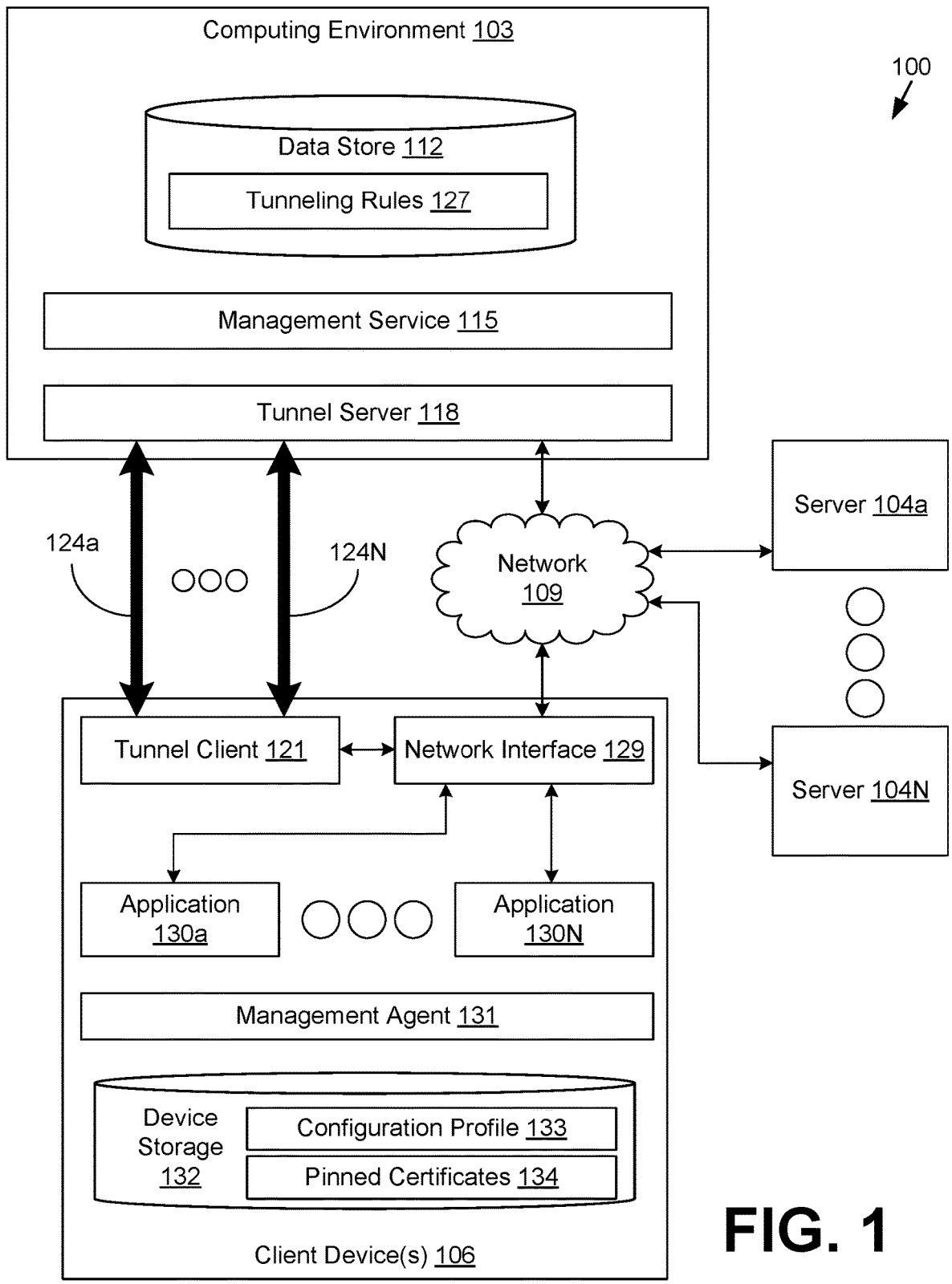
FIG. 1 is a drawing of a networked environment according to various examples of the disclosure.

Disclosed are various examples for providing certificate pinning services within a tunnel endpoint, such as a tunnel client on a client device or a tunnel server. Certificate pinning is a technique for mitigating "man-in-the-middle" (MITM) attacks on communications between two computing devices (e.g., a client and a server or between two servers) that are secured using a version of the SSL or TLS protocol.

In a typical MITM attack on an unencrypted network connection, a third party will intercept all network traffic sent between two computing devices, record and/or modify the intercepted network traffic, and relay the intercepted network traffic to the other computing device. In an example implementation of the attack, the third party will represent itself to the client device as the server. Likewise, the third party would represent itself to the server as the client device. Accordingly, the client device would then send a request to the third party that was intended for the server. The third party would record the request from the client and then forward the request to the server. The server would then send a reply to the third party that was intended for the client. The third party would then record the reply from the server and then forward the reply to the client. The third party could also manipulate or otherwise change the request and reply in any manner desired.

To prevent a MITM attack, the client and the server can agree to communicate using a version of the SSL or TLS protocol. Using the SSL or TLS protocol, the client and the server will first verify each other's identities. For example, the server will present a certificate to the client that identifies the server. The certificate can include information that identifies the owner of the server and information regarding the certificate authority that issued or generated the certificate. If the certificate authority is included in a list of trusted certificate authorities, then the client will assume that the server is owned or operated by the party identified in the certificate. The client and the server will then encrypt each packet sent to the other, rendering any intercepted network traffic unreadable and unmodifiable.

However, the third party can attempt to circumvent the SSL or TLS protocol by relying on a forged or fraudulently generated certificate. These certificates can be forged or fraudulently generated through a number of approaches. In a simple example, the third party could hack or otherwise gain control of a certificate authority trusted by the client. The third party could then use the hacked certificate authority to generate unauthorized certificates on behalf of the server that would be trusted by the client. This would allow the third party to impersonate the server. Accordingly, the third party could decrypt network traffic sent from the client to the server, re-encrypt the network traffic and then forward it to the server, or vice versa.

To prevent a third party from using fraudulently generated or forged SSL or TLS certificates, the true and valid certificates can be "pinned" at the client device. For example, copies or portions of the certificates can be stored in data storage accessible to the client device, and a client can verify that the certificate presented by the server matches the previously stored certificate. In traditional approaches to certificate pinning, the client application, such as a browser, that communicates with the server is required to implement or include code that implements the certificate pinning and verification checks. However, some client applications do not implement certificate pinning or do not implement certificate pinning correctly.

Examples of the present disclosure introduce the concept of certificate pinning by a tunnel client on a client device. A tunnel client can be configured to intercept network traffic originating from various client applications on a client device. The tunnel client can then encrypt and forward the network traffic to a tunnel server that is remotely located. This creates a per-application virtual private network (VPN) that can make the client device, and the applications executed thereon, appear as if they are connected directly to the network of the tunnel server.

Since the tunnel client can have access to the network traffic from multiple client applications on a client device, the tunnel client can be configured to perform certificate pinning on behalf of the client applications. If a client application attempts to open a connection with a server corresponding to a known pinned host, the tunnel client can verify whether the certificate or certificate chain presented by the server corresponds to a pinned certificate. If the certificate or certificate chain presented by the server do not correspond to the pinned certificate, the tunnel client prevent the connection from the client application to the server from being open, thereby avoiding a potential MITM attack. This certificate pinning verification in the tunnel client can occur regardless of whether the client application implements any separate certificate pinning verification, to include Hypertext Transfer Protocol (HTTP) Public Key Pinning or other approaches. In some examples, the operation of the tunnel client, to include certificate pinning, can be configured by a device management agent executed on the client device, where the device management agent can be remotely controlled by a device management service to implement policies or compliance rules.

With reference to FIG. 1, shown is a networked environment 100 according to various examples. The networked environment 100 includes a computing environment 103, a plurality of servers 104a . . . 104N, and one or more client devices 106 in communication by way of network 109. The network 109 can include, for example, wide area networks (WANs), local area networks (LANs), wired networks, wireless networks, other suitable networks, or any combination of two or more networks. For example, the network 109 can include satellite networks, cable networks, Ethernet networks, and other types of networks.

The computing environment 103 can be a computing environment that is operated by an enterprise, such as a business or other organization. The computing environment 103 can include, for example, a server computer, a network device, or any other system providing computing capabilities. Alternatively, the computing environment 103 can employ multiple computing devices that can be arranged, for example, in one or more server banks, computer banks, or other arrangements. The computing devices can be located in a single installation or can be distributed among many different geographical locations. For example, the computing environment 103 can include multiple computing devices that together form a hosted computing resource, a grid computing resource, or any other distributed computing arrangement.

In some cases, the computing environment 103 can operate as at least a portion of an elastic computing resource where the allotted capacity of processing, network, storage, or other computing-related resources can vary over time. The computing environment 103 can also include or be operated as one or more virtualized computer instances. Generally, the computing environment 103 can be operated in accordance with particular security protocols such that it is considered a trusted computing environment. The computing environment 103 can be located remotely with respect to the client device 106.

Various applications and/or other functionality may be executed in the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a management service 115, a tunnel server 118, and other applications, services, processes, systems, engines, or functionality not discussed in detail herein. The management service 115 can administer the operation of client devices 106 registered or otherwise enrolled with the management service 115. To this end, the management service 115 can also provide mechanisms for a client device 106 to enroll or otherwise register with the management service 115. As part of the enrollment process, a secure connection can be created or established between the management service 115 and a client device 106 using a version of the SSL or TLS protocol. The management service 115 can also enforce or otherwise require particular applications to be installed on an enrolled client device 106, require the client device 106 to be configured in a particular manner, or require that particular features be enabled or disabled on the client device 106.

The tunnel server 118 can communicate with a tunnel client 121 on the client device 106 over the network 109 by way of tunnels 124a . . . 124N. In some examples of a tunnel client 121, all network traffic is routed through a server process and determines a termination point on the network 109 for the network traffic. In other examples of a tunnel client 121, the tunnel client 121 employs split routing, where traffic that is destined for a network address on an external network is sent to the termination point on the network 109 and traffic destined for an internal network on a private network is sent to the tunnel server 118, which routes traffic to an internal network destination.

The data stored in the data store 112 includes, for example, tunneling rules 127 among other data. The tunneling rules 127 can configure how the client device 106 implements tunneling, such as which client applications are required to be tunneled, which client applications are not required to be tunneled, whether certificate pinning is required for all or certain applications or network connections, whether certificate pinning is not required for all or certain applications or network connections, and so on. The tunneling rules 127 can be used as part of generating a configuration profile to be installed on one or more client devices 106 by the management service 115.

The servers 104a . . . 104N can provides a variety of services to client applications executed on the client devices 106. The servers 104a . . . 104N can provide services pertaining to email, web servers, file storage and transfer, video and voice telephony, social networking, business sales and contact management, inventory management, task tracking, and so on. The client applications can open secured network connections to the services on the servers 104 using SSL or TLS.

The client device 106 is representative of a plurality of client devices 106 that may be coupled to the network 109. The client device 106 can comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 106 may include a display comprising, for example, one or more devices such as liquid crystal display (LCD)

displays, gas plasma-based flat panel displays, organic light emitting diode (OLED) displays, electrophoretic ink (E ink) displays, LCD projectors, or other types of display devices.

The client device 106 has an operating system, such as WINDOWS, IOS, or ANDROID, and has a network interface 129 in order to communicate with the network 109. The client device 106 is configured to execute a plurality of different applications 130a . . . 130N. The applications 130 can include web browsers, email applications, text message applications, video and voice communication applications, business productivity applications, file transfer applications, and so on. The applications 130 communicate with respective servers 104 to perform their corresponding functionality, which can include, for example, downloading a web page, downloading an email, sending an email, sending a video stream, receiving a voice stream, downloading bulk data, uploading bulk data, and so forth.

The tunnel client 121 is executed to provide point-to-point tunneling of network traffic between the client device 106 and the tunnel server 118. Network traffic originating from the application 130 can be routed from the network interface 129 to the tunnel client 121 rather than directly to the network 109. The tunnel client 121 can secure the traffic by applying a security layer, such as encryption layer, to the traffic. In other words, the tunnel client 121 can wrap the traffic with an encryption layer. The operating system of the client device 106, in some examples, can also allow virtual private network (VPN) capabilities to be bound to one or more applications 130. In other words, the tunnel client 121 can provide per-app VPN capabilities where some or all network traffic originating from an application 130 is routed through the tunnel client 121. In some examples, traffic routed through the tunnel client 121 can be secured using a device certificate generated or obtained by a management service. Such a device certificate can be installed on the client device 106 by a device management system upon receiving the device certificate from the management service. As will be described, the tunnel client 121 can implement certificate pinning on behalf of the applications 130 to protect against man-in-the-middle attacks in which a malicious device masquerades as a legitimate server 104.

The management agent 131 can maintain data communication with the management service 115 in order to perform various actions on the client device 106 in response to instructions received from the management service 115. In some instances, the management agent 131 includes a separate application executing on the client device 106. In other instances, the management agent 131 includes a mobile device management (MDM) framework provided by or included in the operating system installed on the client device 106. The management agent 131 can be configured to communicate with the management service 115 to enroll or otherwise register the client device 106 with the management service 115. The management agent 131 can also be configured to contact the management service 115 at periodic intervals and request that the management service 115 send any commands or instructions to the management agent 131. The management agent 131 can then cause the client device 106 to perform the commands provided by the management service 115.

The client device 106 has a device storage 132 with various data, including application data, operating system data, a configuration profile 133, pinned certificates 134, and other data. The configuration profile 133 can configure compliance rules and other rules to be enforced on the client device 106 by the management agent 131. In particular, the configuration profile 133 may include configuration settings relating to VPN connections to be created by the tunnel client 121. For example, the configuration profile 133 can include a username, a password, a digital certificate, an address of a VPN server, such as the tunnel server 118, a communications protocol (for example, PPP, IPsec, a secure sockets layer (SSL) or TLS-based VPN protocol, or some other VPN protocol) for the VPN connection. In some instances, the configuration profile 133 can also specify values for various settings of the tunnel client 121. For example, the configuration profile 133 can specify which Domain Name System (DNS) servers to use with the tunnel client 121, which Internet protocol (IP) address or addresses to assign to or associate with the tunnel client 121, the subnet mask of the tunnel client 121, the media access control (MAC) address to assign to or associate with the tunnel client 121, and potentially other settings for the tunnel client 121. These various settings can be considered device identification parameters that are embedded within the security layer.

The configuration profile 133 can be obtained by the management agent 131 from a management service 115 and installed on the client device 106. In one example, the management service 115 can initiate installation of a particular application 130 and generate a configuration profile 133 that can be transmitted to and installed by the management agent 131 on the client device 106. The configuration profile 133 can be specifically generated by the installation of the application 130. The configuration profile 133 can cause the operating system of client device 106 to route some or all network traffic originating from the application 130 through a VPN connection that is established by the tunnel client 121. The configuration profile 133 can designate settings relating to when certificate pinning is to be performed by the tunnel client 121, such as for which applications 130 and/or domain names of servers 104 that certificate pinning is to be enabled or disabled.

The pinned certificates 134 correspond to SSL or TLS certificates from servers 104 that have been "pinned." The pinned certificates 134 can include a certificate chain comprising certificates that chain to a root certificate issued by a certificate authority that is considered trusted. In one example, the entirety of a pinned certificate 134 can be stored in the device storage 132. In another example, a hash value or signature of a pinned certificate 134 can be stored in the device storage 132. The pinned certificates 134 can be stored in the device storage 132 when first encountered by the tunnel client 121, or the pinned certificates 134 can be pushed to the client device 106 by the management service 115.

Figure 2:
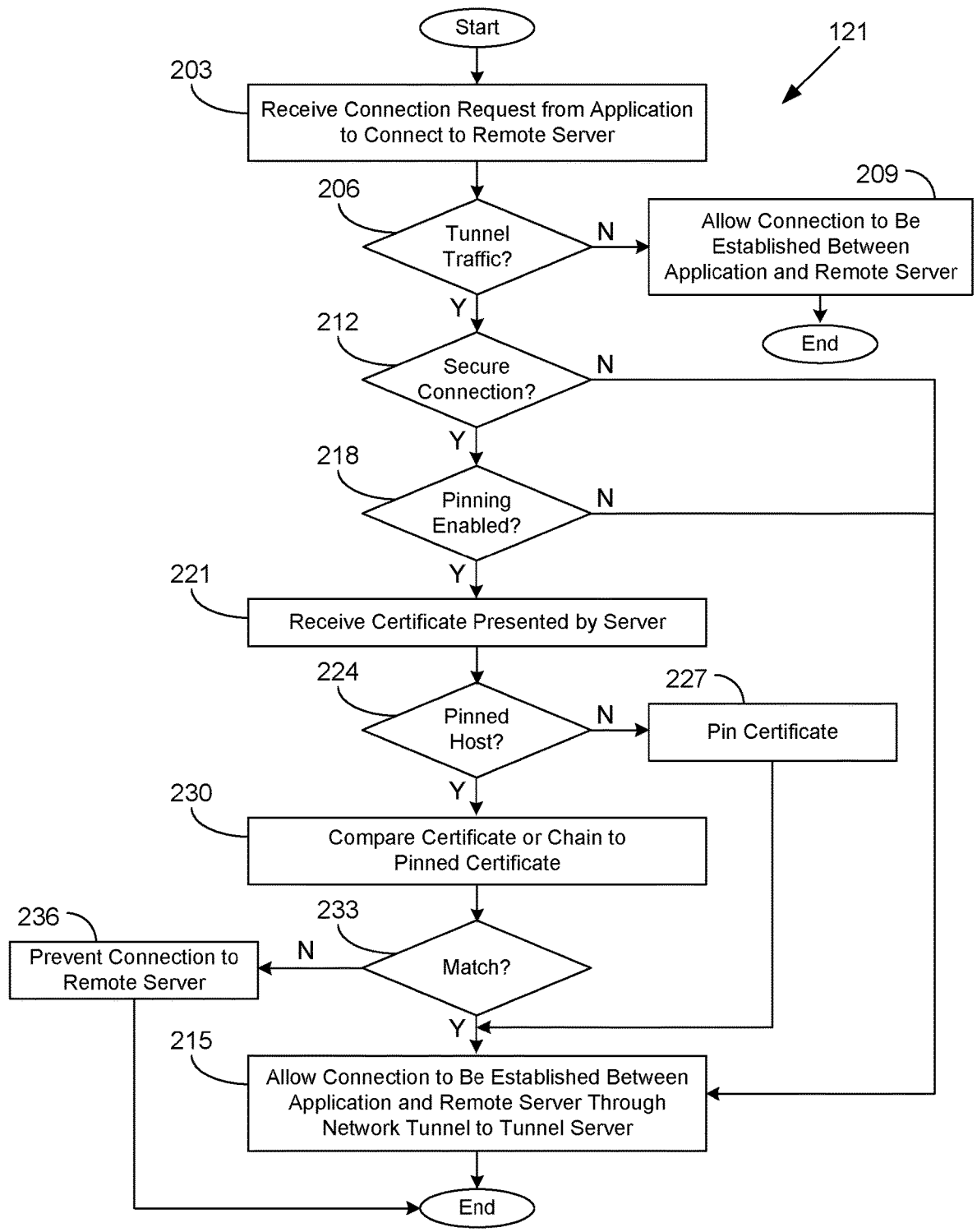
FIGS. 2-3 are flowcharts illustrating examples of functionality according to various examples of the present disclosure.

Turning now to FIG. 2, shown is a flowchart that provides one example of the operation of the tunnel client 121. Functionality attributed to the tunnel client 121 can be implemented in a single process or application or in multiple processes or applications. The separation or segmentation of functionality as discussed herein is presented for illustrative purposes only.

Beginning with step 203, the tunnel client 121 can receive a connection request from an application 130 to connect to a remote server 104. For example, the application 130 can open a user datagram protocol (UDP) or transmission control protocol (TCP) socket to connect to a hostname or internet protocol (IP) address of a server 104 over the network 109. As configured by the operating system of the client device 106, the tunnel client 121 can receive the network traffic corresponding to the connection request from the network interface 129.

At step 206, the tunnel client 121 determines whether the connection request and network traffic should be tunneled. The tunnel client 121 can be configured by the configuration profile 133 and/or the management agent 131 to tunnel some traffic but not others. Network traffic from some applications 130 can be configured to be tunneled, while network traffic from other applications 130 can be configured not to be tunneled. Also, network traffic to certain hostnames or IP addresses can be tunneled, while network traffic to other hostnames or IP addresses can be configured not to be tunneled. The tunneling can be performed for certain types of traffic, network protocols, or according to other criteria.

If the tunnel client 121 determines that the traffic should not be tunneled, the tunnel client 121 moves to step 209 and allows a connection to be established between the application 130 and the remote server 104 over the network 109. Thereafter, the process proceeds to completion. In some cases, even when the network traffic is not to be tunneled, the tunnel client 121 can be configured to perform the certificate pinning functionality that will be described.

If the tunnel client 121 determines that the traffic should be tunneled, the tunnel client 121 continues from step 206 to step 212. At step 212, the tunnel client 121 determines whether a secure connection has been requested. A secure connection corresponds to an encrypted end-to-end connection using hypertext transfer protocol secure (HTTPS) with SSL or TLS. If a secure connection is not to be utilized, the tunnel client 121 moves to step 215 and allows the connection to be established between the application 130 and the remote server 104 through a network tunnel 124 to the tunnel server 118. Thereafter, the process proceeds to completion. In other examples, the tunnel client 121 can be configured through the configuration profile 133 to require a secure connection or to disallow unencrypted connections.

If a secure connection is requested, the tunnel client 121 continues to step 218. At step 218, the tunnel client 121 determines whether certificate pinning is enabled. For example, certificate pinning can be enabled or disabled based on the application 130, the domain name, hostname or IP address of the server 104, or other criteria. If certificate pinning is not enabled, the tunnel client 121 moves from step 218 to step 215 and allows the connection to be established between the application 130 and the remote server 104 through a network tunnel 124 to the tunnel server 118. Thereafter, the process proceeds to completion.

If certificate pinning is enabled, the tunnel client 121 moves from step 218 to step 221 and receives a secure certificate presented by the server 104. At step 224, the tunnel client 121 determines whether the server 104 corresponds to a known pinned host. In other words, the tunnel client 121 determines whether a certificate has already been pinned for the server 104. This can involve a comparison of a first domain name of the server 104 with a second domain name of a known pinned host. If the server 104 does not correspond to a known pinned host, the tunnel client 121 moves to step 227 and pins the certificate presented by the server 104. In so doing, the tunnel client 121 can add the certificate to the pinned certificates 134 in the device storage 132. Afterward, the tunnel client 121 allows the connection to be established between the application 130 and the remote server 104 through a network tunnel 124 to the tunnel server 118. Thereafter, the process proceeds to completion.

If the tunnel client 121 instead determines that the server 104 corresponds to known pinned host, the tunnel client 121 moves from step 224 to step 230 and compares the certificate presented by the server 104 or certificates in the corresponding chain of certificates to the pinned certificate 134 for the known pinned host. The comparison can involve comparing the exact certificate data or comparing derived values from the presented certificate and the pinned certificate 134, such as a hash value. At step 233, the tunnel client 121 determines whether a match occurs. If a match occurs, the certificate is thus verified through certificate pinning. At step 215, the tunnel client 121 allows the connection to be established between the application 130 and the remote server 104 through a network tunnel 124 to the tunnel server 118. Thereafter, the process proceeds to completion.

If a match does not occur, the presented certificate can be deemed potentially fraudulent or otherwise unsafe. The tunnel client 121 moves from step 233 to step 236 and prevents the requested connection to the remote server 104 from being opened, or drops an existing connection. This action prevents potentially unsafe communication between the application 130 and the possibly compromised server 104. Thereafter, the process proceeds to completion.

Although the example of FIG. 2 demonstrates certificate pinning implemented in the tunnel client 121, it is understood that certificate pinning can be implemented in a similar fashion by the tunnel server 118. In one example, the tunnel server 118 can compare presented certificates of known pinned hosts with pinned certificates 134 and then disallow connections when a match is not found.

Figure 3:
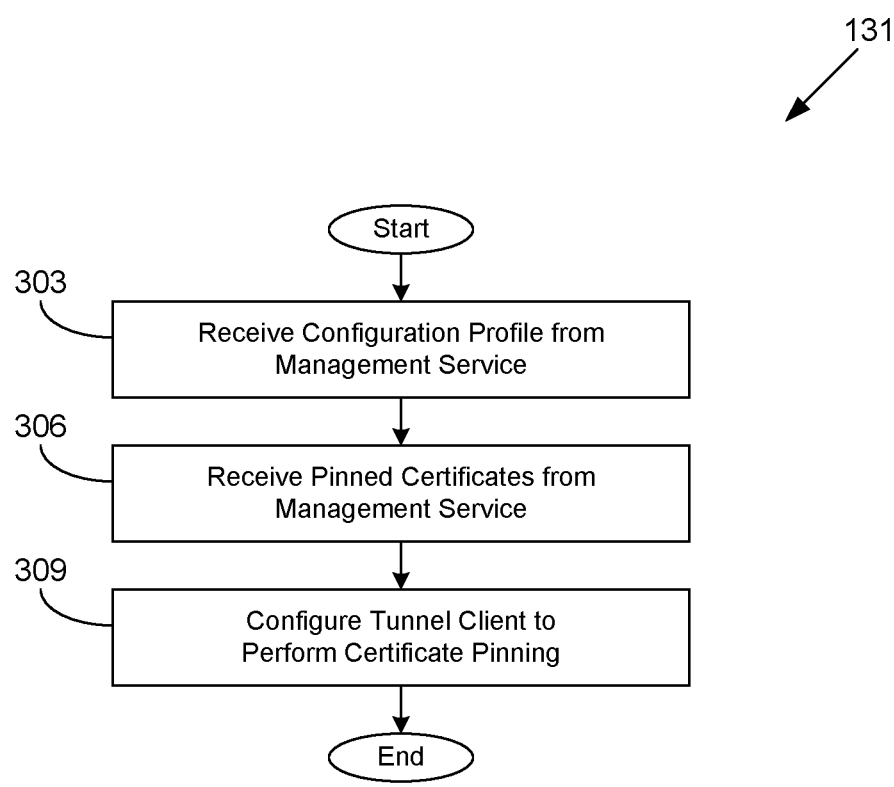

Turning now to FIG. 3, shown is a flowchart that provides one example of the operation of the management agent 131. Functionality attributed to the management agent 131 can be implemented in a single process or application or in multiple processes or applications. The separation or segmentation of functionality as discussed herein is presented for illustrative purposes only.

Beginning with step 303, the management agent 131 can receive a configuration profile 133 from the management service 115 through the network 109. The configuration profile 133 can indicate how tunneling is to be performed by the tunnel client 121 and can be generated based on the tunneling rules 127 that can be configured by an administrator.

At step 306, the management agent 131 can receive one or more pinned certificates 134 from the management service 115 as pinned certificate data through the network 109. Alternatively, the pinned certificates 134 can be obtained over time as applications 130 establish connections with different servers 104. The management agent 131 can store the pinned certificates 134 and/or derived values such as hash values in the device storage 132.

At step 309, the management agent 131 can configure the tunnel client 121 to perform certificate pinning. For example, the management agent 131 can configure the tunnel client 121 to perform certificate pinning for certain domain names, IP addresses, applications 130, types of network traffic, and so on. Thereafter, the process ends.

Figure 4:
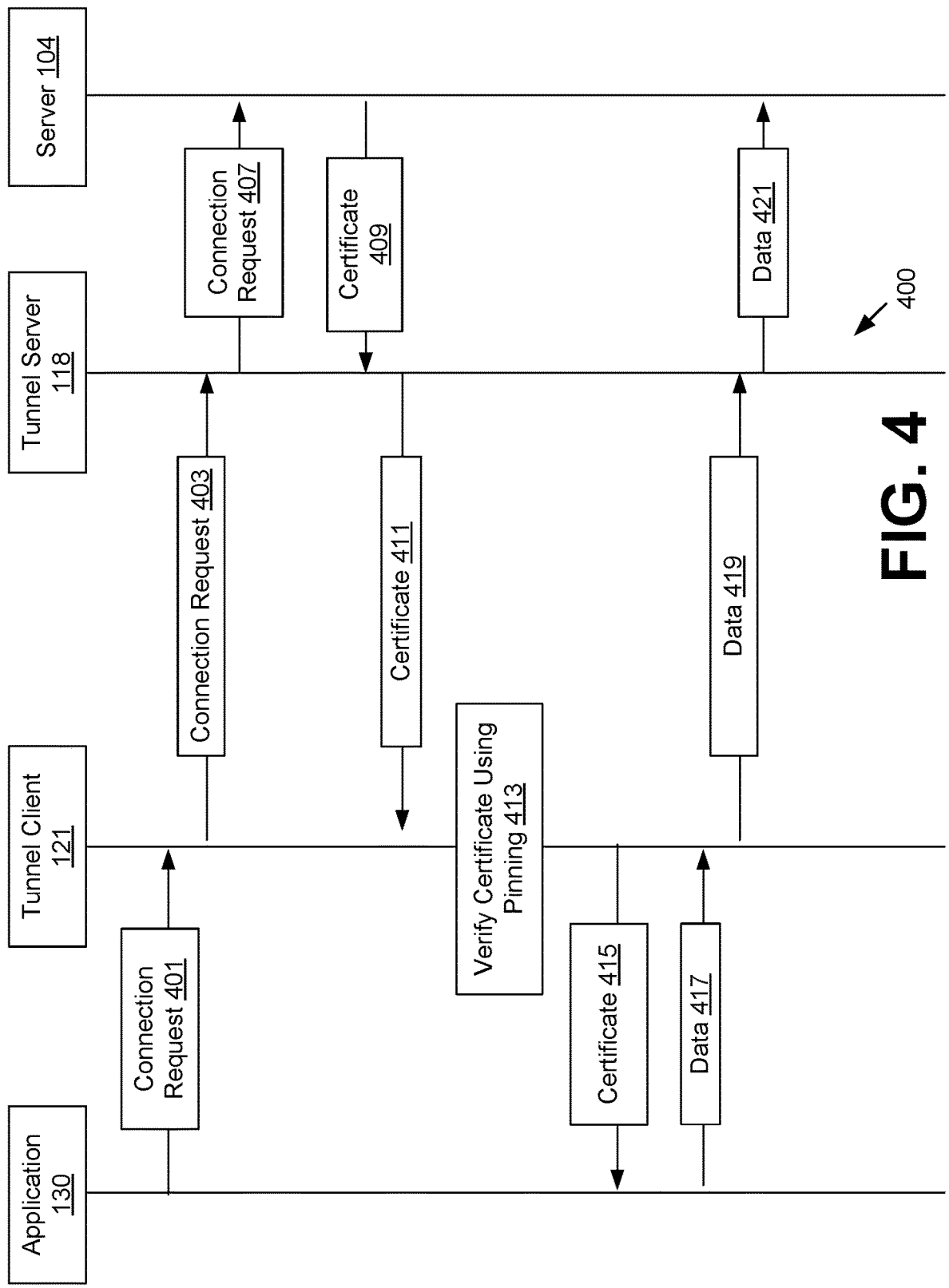
FIG. 4 is a sequence diagram illustrating example component interactions according to various examples of the present disclosure.

Moving on FIG. 4, shown is a sequence diagram 400 illustrating one example of interaction between an application 130, a tunnel client 121, a tunnel server 118, and a remote server 104. Functionality attributed to the applications 130, the tunnel client 121, the tunnel server 118, and the server 104 can be implemented in fewer processes or applications or in additional processes or applications. The separation or segmentation of functionality as discussed herein is presented for illustrative purposes only.

Beginning with step 401, the application 130 can send a connection establishment request to a remote server 104 at a hostname or IP address and a specified port. The tunnel client 121 can receive the connection request and can forward it through a tunnel 124 to the tunnel server 118 at step 403. At step 407, tunnel server 118 can receive the connection request through the tunnel 124 and then forward it to the server 104 through the network 109. The server 104 responds with a certificate at step 409 that is returned to the tunnel server 118.

The certificate is then forwarded at step 411 to the tunnel client 121 through the tunnel 124. At step 413, the tunnel client 121 verifies the certificate using certificate pinning. To this end, the tunnel client 121 can compare the certificate with a pinned certificate 134 that is stored on the client device 106. Subsequently upon verification, the tunnel client 121 can return the certificate to the application 130 at step 415.

At step 417, the application 130 can use a public key in the certificate that has been verified to encrypt data and then send it to the server 104, which is intercepted by the tunnel client 121. At step 419, the tunnel client 121 can further encrypt the data and send it through the tunnel 124 to the tunnel server 118. At step 421, the tunnel server 118 can decrypt the data from the tunnel 124 and then forward the data encrypted with the certificate to the server 104. Subsequently, the server 104 can send data back to the application 130 by way of the tunnel server 118, the tunnel 124, and the tunnel client 121.

The flowcharts of FIGS. 2 and 3 and the sequence diagram of FIG. 4 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 2 and 3 and the sequence diagram of FIG. 4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the sequence diagrams can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The individual components of the computing environment 103, the servers 104, the client device 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 115, the tunnel server 118, the server 104, the tunnel client 121, the network interface 129, the application 130, the management agent 131, and other components described herein, can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, or flash memory. Further, any logic or component described herein can be implemented and structured in a variety of ways. One or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system for certificate pinning in a tunnel client, comprising:
   a client device comprising a processor and a memory; and
   the tunnel client comprising machine readable instructions stored in the memory that, when executed by the processor, cause the client device to at least:
      receive a connection request from an application executed by the client device to connect to a remote server;
      determine that the remote server corresponds to a known pinned host;
      determine whether the remote server presents a certificate matching a pinned certificate for the known pinned host, wherein data identifying the pinned certificate is stored by the tunnel client in a device storage of the client device; and
      in response to determining that the remote server presents the certificate matching the pinned certificate for the known pinned host, allow a connection to be established between the application and the remote server through a network tunnel between the tunnel client and a tunnel server and route network traffic between the application and the remote server through the network tunnel; and a management agent comprising machine readable instructions stored in the memory that, when executed by the processor, cause the client device to at least:
receive pinned certificate data from a management service, the pinned certificate data including the pinned certificate.

2. The system of claim 1, wherein the application does not perform certificate pinning.

3. The system of claim 1, wherein the certificate matches the pinned certificate when a certificate chain associated with the certificate matches the pinned certificate.

4. The system of claim 1, wherein the tunnel client further comprises machine readable instructions that cause the client device to at least:
in response to determining that the remote server does not present the certificate matching the pinned certificate for the known pinned host, prevent the connection from being established between the application and the remote server.

5. The system of claim 1, wherein the tunnel client further comprises machine readable instructions that cause the client device to at least encrypt the network traffic sent through the network tunnel.

6. The system of claim 5, wherein the network traffic includes encrypted traffic from the connection that is previously encrypted by the application when received by the tunnel client.

7. The system of claim 1, wherein the management agent further comprises machine readable instructions that cause the client device to at least:
receive a configuration profile from a management service, the configuration profile identifying a plurality of applications on the client device for which network traffic is to be routed through the tunnel client; and
implements the configuration profile on the client device.

8. The system of claim 1, wherein determining that the remote server corresponds to the known pinned host further comprises determining that a first domain name of the remote server matches a second domain name of the known pinned host.

9. A method for certificate pinning in a tunnel client, comprising:
receiving, by a management agent executed in a client device, pinned certificate data from a management service, the pinned certificate data including a pinned certificate;
receiving, by the tunnel client executed in the client device, a connection request from an application executed by the client device to connect to a remote server;
determining, by the tunnel client, that the remote server corresponds to a known pinned host;
determining, by the tunnel client, whether the remote server presents a certificate matching the pinned certificate for the known pinned host, wherein data identifying the pinned certificate is stored by the tunnel client in a device storage of the client device; and
in response to determining that the remote server presents the certificate matching the pinned certificate for the known pinned host, allowing a connection to be established between the application and the remote server through a network tunnel between the tunnel client and a tunnel server.

10. The method of claim 9, wherein determining that the remote server corresponds to the known pinned host further comprises determining that a first domain name of the remote server matches a second domain name of the known pinned host.

11. The method of claim 9, further comprising, in response to determining that the remote server does not present the certificate matching the pinned certificate for the known pinned host, preventing the connection from being established between the application and the remote server.

12. The method of claim 9, further comprising encrypting, by the tunnel client, network traffic sent through the network tunnel.

13. The method of claim 9, further comprising:
receiving, by the management agent executed in the client device, a configuration profile from a management service, the configuration profile identifying a plurality of applications on the client device for which network traffic is to be routed through the tunnel client; and
implementing, by the management agent, the configuration profile on the client device.

14. The method of claim 9, wherein the client device comprises a mobile computing device.

15. The method of claim 9, wherein the application does not perform certificate pinning.

16. A non-transitory computer readable medium comprising machine readable instructions that, when executed by a processor of a client device, cause the client device to at least:
receive a pinned certificate from a management service;
receive a connection request from an application executed by the client device to connect to a remote server;
determine that the remote server corresponds to a known pinned host;
determine whether the remote server presents a certificate matching the pinned certificate for the known pinned host, wherein data identifying the pinned certificate is retrieved from a device storage of the client device; and
in response to determining that the remote server does not present the certificate matching the pinned certificate for the known pinned host, prevent a connection from being established between the application and the remote server.

17. The non-transitory computer readable medium of claim 16, wherein determining whether the remote server presents the certificate matching the pinned certificate for the known pinned host further comprises comparing a first hash value of the certificate to a second hash value of the pinned certificate.

18. The non-transitory computer readable medium of claim 16, further comprising machine readable instructions that cause the client device to at least:
receive a connection request from a second application executed by the client device to connect to a second remote server;
determine that the second remote server corresponds to a second known pinned host;
determine whether the second remote server presents a second certificate matching a second pinned certificate for the second known pinned host; and
in response to determining that the second remote server presents the second certificate matching the second pinned certificate for the second known pinned host, allow a connection to be established between the second application and the second remote server through a network tunnel to a tunnel server.

19. The non-transitory computer readable medium of claim 16, further comprising machine readable instructions that cause the client device to at least determine that the connection request is to be routed through a tunnel client based at least in part on a configuration profile maintained on the client device by a management agent.

20. The non-transitory computer-readable medium of claim 16, wherein the application does not perform certificate pinning.

* * * * *